(12) United States Patent
Vogel

(10) Patent No.: US 11,673,201 B2
(45) Date of Patent: Jun. 13, 2023

(54) METHOD AND APPARATUS FOR PROVIDING WELDING TYPE POWER USING DOUBLE FORWARD CONVERTER

(71) Applicant: Illinois Tool Works Inc., Glenview, IL (US)

(72) Inventor: Bernard J. Vogel, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 968 days.

(21) Appl. No.: 16/535,260

(22) Filed: Aug. 8, 2019

(65) Prior Publication Data

US 2021/0039186 A1 Feb. 11, 2021

(51) Int. Cl.
*B23K 9/10* (2006.01)
*H02M 3/335* (2006.01)
*B23K 9/09* (2006.01)

(52) U.S. Cl.
CPC .......... *B23K 9/1075* (2013.01); *B23K 9/1012* (2013.01); *H02M 3/33573* (2021.05); *B23K 9/091* (2013.01)

(58) Field of Classification Search
CPC .... B23K 9/1056; B23K 9/091; B23K 9/1012; B23K 9/0671; B23K 9/1043; H02M 3/33507; H02M 3/3353
See application file for complete search history.

(56) References Cited

U.S. PATENT DOCUMENTS

| 4,376,284 A * | 3/1983 | Bader ................. B41J 2/14298 347/85 |
| 5,349,157 A * | 9/1994 | Blankenship ......... H02M 3/285 323/258 |
| 8,179,100 B2 * | 5/2012 | Vogel ................ H02J 7/007184 320/140 |
| 8,445,794 B2 | 6/2013 | Vogel |
| 8,952,293 B2 * | 2/2015 | Vogel .................. H02M 3/3353 219/130.1 |
| 2014/0001167 A1 * | 1/2014 | Bunker ................ B23K 9/1043 219/130.21 |
| 2018/0304393 A1 * | 10/2018 | Vogel ................... B23K 9/1075 |
| 2018/0304394 A1 * | 10/2018 | Vogel .................. H02M 3/3353 |

OTHER PUBLICATIONS

European Office Action Appln No. 20189516.6 dated Jan. 27, 2021.
(Continued)

*Primary Examiner* — Brian W Jennison
(74) *Attorney, Agent, or Firm* — McAndrews, Held & Malloy, Ltd.

(57) ABSTRACT

A method and apparatus for providing welding type power includes receiving input power and pulse width modulating a first forward converter and a second forward converter so that they operate as a pulse width modulated double forward converter to provide a welding type output. A phase relationship between the first forward converter and a second forward converter is selected from at least two available phase relationships using a controller. The controller includes a pwm module, and the pwm module includes a phase relationship module. The at least two available phase relationships are at least two of variable phase shifting, fixed phase staggering and locked in phase. The selected phase relationship is maintained over a predetermined range of outputs.

15 Claims, 11 Drawing Sheets

(56) References Cited

OTHER PUBLICATIONS

Non-Final Office Action U.S. Appl. No. 15/956,966 dated Feb. 19, 2021.
Response to Non-Final Office Action U.S. Appl. No. 15/956,966, filed Aug. 1, 2021.
Final Office Action U.S. Appl. No. 15/956,966 dated Nov. 16, 2021.
Response to Final Office Action U.S. Appl. No. 15/956,966, filed Apr. 18, 2022.
Final Office Action U.S. Appl. No. 15/956,966 dated May 13, 2022.

* cited by examiner

METHOD AND APPARATUS FOR PROVIDING WELDING TYPE POWER USING DOUBLE FORWARD CONVERTER

FIELD OF THE INVENTION

The present disclosure relates generally to the art of welding type power supplies. More specifically, it relates to welding type power supplies with two forward converters.

BACKGROUND OF THE INVENTION

This disclosure is an improvement to the welding type power supply shown in U.S. Pat. Nos. 8,952,293, 8,455,794, and US Patent Publication US2018-0304393, each of which is incorporated by reference and will be used as the basis for the background and description of PSDF (phase shifted double forward converter) in a welding type application. This improvement can also be applied to a PSDF used in a battery charger, such as U.S. Pat. No. 8,179,100, also incorporated by reference. Welding type power supply, as used herein, refers to a power supply that can provide welding type power. Welding type power, as used herein, refers to power suitable for welding, plasma cutting, induction heating and/or hot wire welding/preheating (including laser welding and cladding).

Welding-type power supplies typically convert AC power to an output suitable for welding type operations. The output power is provided at an appropriate voltage and/or current level, and may be controlled and regulated according to the process requirements. Many industrial welding and cutting processes have dynamic load voltage and current requirements that cannot be met by a static power supply output. For instance, initiation of an arc, electrode characteristics, length of an active arc, operator technique, and so forth, may all contribute to transient voltage requirements. Oftentimes, these dynamic requirements, which are above the average load conditions, are of short duration (from about 1 millisecond to a few seconds) and comprise only a small part of the overall welding or cutting time. Accordingly, the power supply should be capable of providing both average and dynamic load requirements.

Single or double forward converter circuits are currently used to fulfill these dual requirements in some welding-type power supplies. The average load requirements typically determine the thermal design of the power supply circuits, dictating the size and rating of components such as transformers, heat sinks, power devices, cooling fans and so forth. However, for welding and cutting power supplies to accommodate short dynamic loads, components capable of handling the short but extreme requirements traditionally are chosen. This can result in a circuit with oversized components or a lack of efficiency when the power supply is operating at average conditions.

PSDF based welding-type power supplies can better handle both static and dynamic load requirements without some of the inefficiencies of other designs. For example, PSDF based welding-type power supplies can varying output voltage at the welding or cutting torch by manipulating the duty cycles of two forward converter circuits. Prior art PSDF welding-type power supplies found in U.S. Pat. Nos. 8,952,293 and 8,455,794 increase synchronized duty cycles in a pair of forward converter circuits in response to increasing output voltage demand. Then they change a phase shift between the duty cycles in response to further increases in output voltage demand. They also accommodate the time needed for the transformer core to reset via leading edge (the start of the pulse) or lagging edge (the end of the pulse) compensation.

Phase shifting was improved by doing it in such way as to reduce the loss of control. Prior art patent U.S. Pat. No. 8,952,293 describes a "leading" and "lagging" converter circuit (forward converter). Leading refers to operation in a phase shifted mode whereby one of the converters starts its PWM (pulse width modulating) cycle before the other (i.e. it leads). Lagging refers to the other converter which begins its PWM cycle after the first converter (i.e. it lags). The '293 patent describes how the leading converter shifts in and out of phase while the lagging converter remains fixed in its PWM timing. The '293 patent describes taking some type of action to allow sufficient time for the forward converter transformer to fully reset as the phase shift is increasing.

These actions may include skipping a complete pulse, reducing the duty cycle of a pulse by delaying the new phase shifted leading edge, or initiating a new pulse before the core has fully reset and then reducing the pulse width by adjusting the trailing edge, to allow the core more time to reset at the end of the pulse. Skipping or reducing a pulse width of the leading converter injects a momentary disturbance in the control. This means the control loop does not get the overall duty cycle (phase shift plus leading and lagging duty cycles) that it is trying to command as required by the dynamic needs of the welding arc. This can lead to an undesirable disturbance in the welding arc, such as an arc outage or an undershoot or overshoot of the current from what the weld process control is requesting.

Initiating a new pulse before the core is fully reset may also have a turn on transient while the core demagnetizing current is still flowing. In addition, if the control loop is further increasing the phase shift, this can lead to additional consecutive cycles where the core has not fully reset and potentially lead to transformer saturation.

Some prior art PSDF based welding-type power supplies operate in phase (the pulse from each converter begins and ends at the same time) the majority of the time to provide the static or average requirements of a weld process. During momentary dynamic conditions the welding arc requires higher voltage than can be met by the in phase operation of the converter circuits, so prior art PSDF based welding-type power supplies will shift out of phase (so that the pulse from one converter begins at a different time than the pulse from the other converter). Once the dynamic condition goes away, they will again operate in phase. During the time the two converters operate in phase, they split the load current. Thus each converter operates at half current. This provides for more efficient operation by reducing losses in the semiconductor switches and transformers.

However, during the time the converters operate in a phase shifted mode losses can be significantly higher because each converter is now individually carrying the full current. It is thus desirable that the two converters don't operate in a phase shifted mode for extended periods of time and/or current. The '293 patent describes means of limiting the time and/or reducing the current levels during phase shifted operation.

The '293 patent teaches a control that may drive the converter operation into a phase shifted mode during a high current condition, even though the actual arc voltage may not be higher than normal. This can happen for example while pulse GMAW (GMAW-P) welding and the weld process requires the current to be driven from a relatively low background current level (ex. 40-100 Amps) to a relatively high peak current (ex. 400-600 Amps) in a short time duration (ex. 0.5 msec to 1.0 msec). To overcome the effect of the circuit impedance and inductance, which includes the inductance of the weld cables, the PSDF shifts out of phase to provide sufficient drive voltage to raise the current level at the required di/dt rate. This condition is brought about by the weld process waveform generation, and not directly by a dynamic change in the arc voltage (which can occur while during SMAW welding).

The relationship between duty cycle and actual output voltage is not ideal, and is often described in terms of output droop. As the two converter circuits shift from in phase to out of phase operation, particularly at higher output current, the output voltage will momentarily decrease rather than increase as expected by the control. This momentary decrease in voltage appears as a non-linearity or discontinuity in the control loop. This non-linearity can lead to disturbances in the arc as the control is forced to "catch-up" and further increase the phase shift to achieve the desired output voltage. It can also allow the PSDF to get "caught" in a phase shifted mode and not naturally transition back to an in phase operation.

Some prior art PSDF based welding-type power supplies typically limit the maximum switch duty cycle to between 0.4 and 0.5, to provide sufficient time for the transformer core to reset. This limit has to take into account various non ideal parameters and conditions, such as gate drive delays and voltage rise times on the switches when they turn off. Some prior art operates the two converters of the PSDF in phase for the majority of the operating conditions, and only shift out of phase for momentary dynamic load conditions. They found it desirable to utilize a maximum switch duty cycle (Dmax) as close to 0.5 as practical to provide the widest window of operation for in phase operation. However, the effects of gate drive delays and voltage rise times may vary depending on the switch current, which is related to the output load current. Prior art PSDF based welding-type power supplies typically select a single DMax for all load currents, in effect using a Dmax that is not as high as possible for some load currents.

When PSDF based welding-type power supplies operate at low voltage and/or low current the PWM pulse width is reduced to such a low value that it becomes difficult to consistently generate switching cycles. The control in some prior art PSDF based welding-type power supplies will often cause the converters to skip some number of switching cycles followed by one or more cycles of a very small pulse width. This control can lead to increased current ripple, overshoots or undershoots, or inconsistent behavior when operating at low current and low voltage. Typically, the PWM switching behavior becomes more consistent at higher current levels and/or higher voltage levels.

US Patent Publication US2018-0304393 taught improved phase shifting, full or partial compensation of the duty cycle based on output load current, modification of Dmax based on output load current and improved low voltage/low current operation. The improved phase shifting by fixed the PWM timing of the one converter and adjusted both the leading and trailing edges of the other converter to reduce the loss of control and to achieve the overall duty cycle as required by the control Full or partial compensation of the duty cycle based on output load current was taught to help linearize the control. The maximum duty cycle (Dmax) was modified based on output load current to provide a wider window of operation for in phase operation. Operation at low voltage and or low current was improved by reducing pulse skipping by disabling one converter at low output. The PWM OFF time was increased in a controlled manner once a minimum PWM duty cycle ON time has been reached to provide a further increase in the window of operation where a consistent pulse width can be commanded.

Generally the prior art operates in a PSDF mode (phase shifted double forward mode). The two converters are responsive to a control signal such that an increase in the control signal will initially provide for an increase of the in-phase duty cycles of the two forward converters. Further increases in a control signal beyond a certain limit will cause the two converters to operate in a partially or fully phase shifted manner, until an upper limit is reached representing full phase shift and maximum duty cycle for each converter (DMAX).

While the prior art discussed herein was an improvement over earlier welding power supplies, a further reduction in output current ripple, particularly in some modes of operation, and improved duty cycle resolution, particularly in some modes of operation could improve arc performance and reduced arc outages.

SUMMARY OF THE PRESENT INVENTION

According to a first aspect of the disclosure a method of providing welding type power includes receiving input power and pulse width modulating a first forward converter and a second forward converter so that they operate as a pulse width modulated double forward converter to provide a welding type output. A phase relationship between the first forward converter and a second forward converter is selected from at least two available phase relationships. The at least two available phase relationships are at least two of variable phase shifting, fixed phase staggering and locked in phase. The selected phase relationship is maintained over a predetermined range of outputs.

According to a second aspect of the disclosure a welding type power supply comprises a double forward converter and a controller. The double forward converter has first and second converters. The controller includes a pwm module that sets the pwm timing signals, and the pwm module includes a phase relationship module having a plurality of timing outputs connected to the double forward converter.

Selecting the phase relationship is performed in response to at least one of feedback responsive to the welding type output, a user input and a process selection in one alternative.

Selecting the phase relationship is performed in response to a user input indicative of at least one of a desired output current, a desired peak output current and a desired output voltage in another alternative.

Selecting the phase relationship is performed in response to at least one of a user selected SMAW process, a user selected GTAW process and a user selected GMAW process in one embodiment.

Selecting the phase relationship is performed in response to feedback responsive to at least one of a welding type output current, a welding type output voltage, a welding type peak current and a welding type output power in various embodiments.

Maintaining the selected phase relationship over a substantial range of outputs includes maintaining the selected phase relationship for at least one half of a rated output in one alternative.

Maintaining the selected phase relationship over a substantial range of outputs includes maintaining the selected phase relationship for a range of duty cycles in another alternative.

The forward converters are stacked forward converters and their outputs combined in one embodiment.

The phase relationship module has and is responsive to an input that is connected to receive at least one of feedback responsive to the welding type output, a user input and a process selection in various embodiments.

The phase relationship module input is connected to receive a user input indicative of at least one of a desired output current, a desired peak output current and a desired output voltage in one alternative.

The phase relationship module input is connected to receive at least one of a user selected SMAW process, a user selected GTAW process and a user selected GMAW process in another alternative.

The phase relationship module input is connected to receive feedback responsive to at least one of a welding type output current, a welding type output voltage, a welding type peak current and a welding type output power in one embodiment.

The phase relationship module is responsive to the welding type output current being greater than one half of a rated output in various embodiments.

Other principal features and advantages of will become apparent to those skilled in the art upon review of the following drawings, the detailed description and the appended claims.

Figure 1:
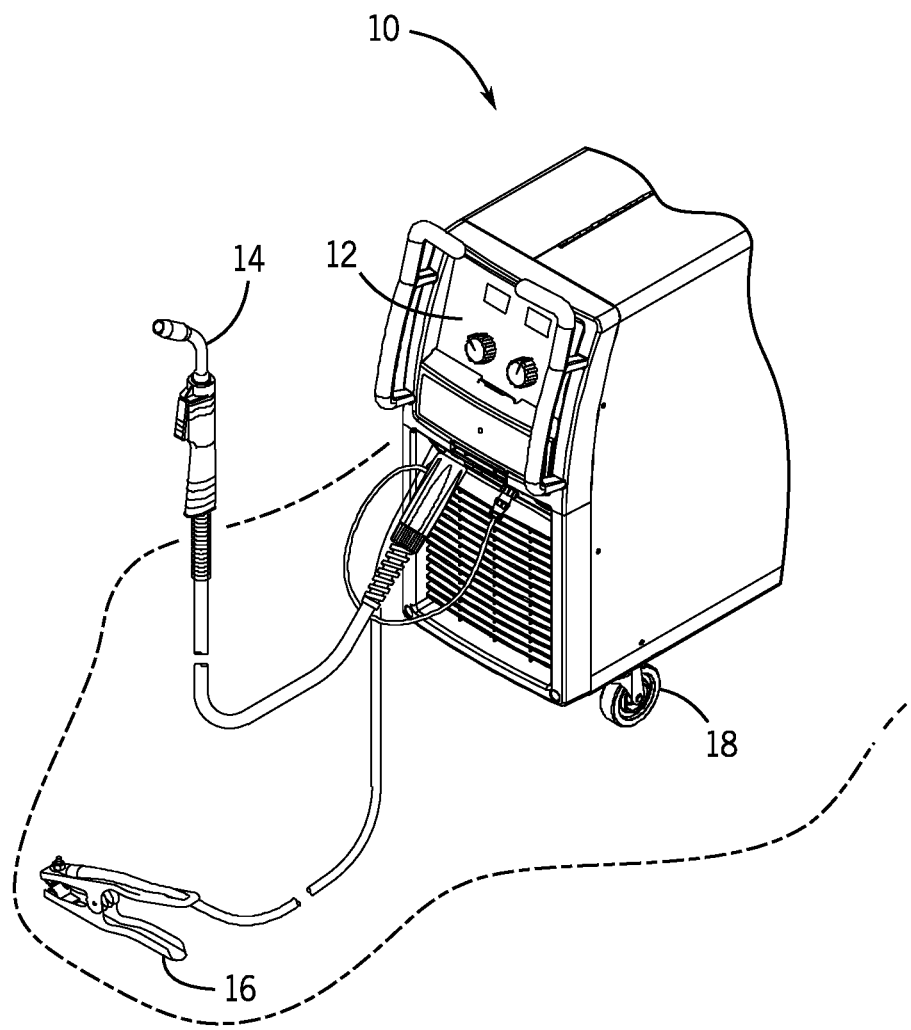
FIG. 1 is an exemplary welding type power supply unit.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to particular topologies and particular control schemes to produce a welding type output it should be understood at the outset that the welding type power supply and method of producing welding type power can also be implemented with other circuitry and other control schemes.

The present invention may be best understood with reference to the prior art. The power circuitry used herein can be that found in prior art U.S. Pat. No. 8,952,293 and prior art US Patent Publication US2018-0304393. The prior art describes how that circuitry may be operated in a PSDF mode of operation. Generally, the present invention provides for a pulse width modulated double forward converter to have three modes of operation, also called three phase relationships. This invention provides for the PSDF mode (or variable phase shifting mode) of operation, along with two additional modes: A locked-in-phase mode (LIP) and a fixed-phase-stagger mode (FPS). Variable phase shifting as used herein, refers to phase shifting the output of a converter relative to the output of another converter in response to at least one of a duty cycle, a current command, a user setpoint, and an output. Locked in phase, as used herein, refers to a fixed relative phase that is in phase. Fixed phase staggering, as used herein, refers to a fixed relative phase that is not in phase.

The PSDF mode of operation is taught by U.S. Pat. No. 8,952,293 and prior art US Patent Publication US2018-0304393. Two forward converter circuits 24 and 26 (FIG. 2) provide a welding power output whereby the two converters operate in phase during a majority of the time while producing load current and voltages within a "normal" range. During transient events, when the load voltage exceeds the volt-amp load line capability of the two in phase converters, one converter will shift out of phase relative to the second converter such that the combined output of the two converters produces a higher load voltage to satisfy the requirements of the transient event. Once the transient event is no longer present the two converters will again operate in phase to satisfy the "normal" load requirements.

The control system is responsive to the static and dynamic requirements of the welding arc or output load on the welding power supply. In response to a control signal the PWM pulse width of the two in phase converters will increase as the load current or voltage increases requiring the power supply to increase its output. Once a maximum pulse width (Dmax) is reached for the two in phase converters, a further increase in the control signal will cause one of the converters to begin to shift out of phase with the second converter such that the combined output of the two converters further increases. A further increase in the control signal will cause a further increase in the phase shift relationship, until a maximum phase shift (i.e. fully out of phase for example) is reached at which point no further phase shift will occur.

At this point a maximum output of the two phase shifted converters has been reached. In response to a decrease in the control signal, for example as a transient event is ending and normal load conditions are once again present, the phase shift between the two converters will decrease. A further decrease in the control signal will provide a further decrease in the phase shift relationship until the two converters are once again operating in phase at maximum duty cycle. A further decrease in the control signal beyond that will provide for a decrease in the PWM pulse width of the two in phase converters.

The control system that may restrict operation of the two converters in a fully or partially phase shifted manner for excessive amounts of time or for excessive output load currents as indicated by a feedback signal. The control system may force the two converters to shift back into phase or restrict the operation of the two converters so they can only operate in phase as a means to thermally protect the two converters, and prevent excess thermal stress by operating for extended periods of time in a phase shift mode. The relative phase between a LEAD converter and LAG converter is controlled such that the control is satisfied and the two converters are always guaranteed to have sufficient time for their respective transformers to reset. There is load line compensation to improve the transition between in phase and phase shifted modes of operation.

There is a low current mode whereby the in-phase duty cycles of the LEAD and LAG converter have reached a certain minimum value, further decreases in a control signal will cause each converter (LEAD & LAG) to alternately skip a cycle of operation such that only one converter is ON and providing load for each PWM switching cycle. The two converters at that point continue to operate in their respective in-phase relationship, but just alternate which converter is on for a given cycle.

Preferably, the two converters operate in phase at a duty cycle responsive to a control signal. An increase in the control signal beyond a certain limit (i.e. once the two in duty cycle have reached a maximum, DMAX) will cause the two converters to shift fully out of phase but at approximately ½ of their in duty cycle. A further increase in the control signal will provide for an increase in the duty cycle of the two fully phase shifted converters until once again a maximum duty cycle (DMAX) of the two converters is reached. This PSDF mode provides for a range of duty cycle and phase shift in response to a control signal. These modes give a control range responsive to the control signal that is approximately 0 to 2*DMAX or approximately 0 to 0.9 (or 0 to 1.0).

The invention provides for a second mode of operation: the locked in phase (LIP) mode. This mode provides a control system that locks the operation of forward converters in phase. The relative phase is fixed at zero, or in phase. For LIP mode, the PWM pulse width of the two converters is responsive to a control signal. The control system may provide a duty cycle response for LIP mode such that the full range of a control signal will provide for a control range of 0 to DMAX (ex. 0 to 0.45 or 0 to 0.50). This may provide a finer resolution of control compared to PSDF mode where the full range of the control signal must provide for approximately twice the range of effective duty cycle (i.e. 0 to 2×DMAX or 0 to 0.9 or 0 to 1.0) LIP mode provides a load line or output voltage characteristic that can satisfy a "normal" load voltage requirement, but may not have sufficient voltage or load line to provide for a dynamic or transient load voltage as required by certain weld processes such as SMAW. LIP mode may be beneficial for certain weld processes. For example, GTAW where the requirement for high dynamic load voltages does not exist.

The invention provides for a third mode of operation, the fixed phase stagger mode: The FPS mode provides a control system that locks forward converters 24 and 26 to operate in a fully phase shifted mode. The relative phase is fixed at approximately 0.5 or 50% of the PWM period (i.e. full phase shift). The relative phase may be fixed at a value other than 50%, (ex. 40% to 60%) such that the two converters are still operating out of phase and each carrying full load current during their respective operating duty cycles. Alternatives provide for other fixed phases.

The control system may provide a duty cycle response for FPS mode such that the full range of a control signal will provide for a control range of 0 to DMAX (ex. 0 to 0.45 or 0 to 0.50). This may provide a finer resolution of control compared to PSDF mode where the full range of the control signal must provide for approximately twice the range of effective duty cycle (i.e. 0 to 2×DMAX or 0 to 0.9 or 0 to 1.0).

The FPS mode may provide for a reduction in the output ripple current. The effective ripple frequency of the combined output of the two forward converters will be 2× compared to an in phase or partially phase shifted mode of operation (i.e. LIP or PSDF modes). This increase in the ripple frequency may result in a corresponding reduction in the pk-pk amplitude of the ripple current providing for an increase in the minimum output current. FPS mode can provide the full dynamic voltage range similar to PSDF mode, which may be beneficial for certain weld processes.

Each converter carries the full load current in the FPS mode, similar to the phase shifted mode of operation for PSDF mode. It may be desirable therefore to limit FPS mode to output current levels (i.e. preset current for example) such that the average output current is less than the full rating of the machine. For example FSP mode may be limited to a current range equivalent to ½ of the full rating of the machine (i.e. limit FSP mode to 150 Amps or less on a 300 Amp machine). The FPS mode may be beneficial for low current SMAW for example where the increase in the minimum current as well as the ability to provide for high dynamic voltages can satisfy the need to prevent arc outages and improve weld performance.

The preferred embodiment of the PSDF based welding-type power supply and control thereof can be implemented with the circuit shown in the '293 patent and in US Patent Publication US2018-0304393, and the control will be the same as that described therein, except as otherwise discussed.

FIG. 1 is an exemplary welding type power supply unit 10 which powers, controls, and provides supplies to a welding or cutting operation in accordance with aspects of the present invention. The side of the power supply unit 10 that faces the user contains a control panel 12, through which the user may control the supply of materials, such as power, gas flow, wire feed, and so forth, to a welding or cutting torch 14, and/or select a process. A work lead clamp 16 typically connects to a workpiece to close the circuit between the torch 14, the work piece, and the supply unit 10, and to ensure proper current flow. It should be noted that in some embodiments, such as for stick welding operations, the torch 14 may be an electrode. The portability of the unit 10 depends on a set of wheels 18, which enable the user to move the power supply unit 10 to the location of the weld. Welding-type power supply unit 10 receives input power from a typical source, such as utility power, engine power, battery power, fuel cell, etc. Welding-type power supply unit 10 provides a welding type output (welding type power) across the work clamp and cutting torch.

Figure 2:
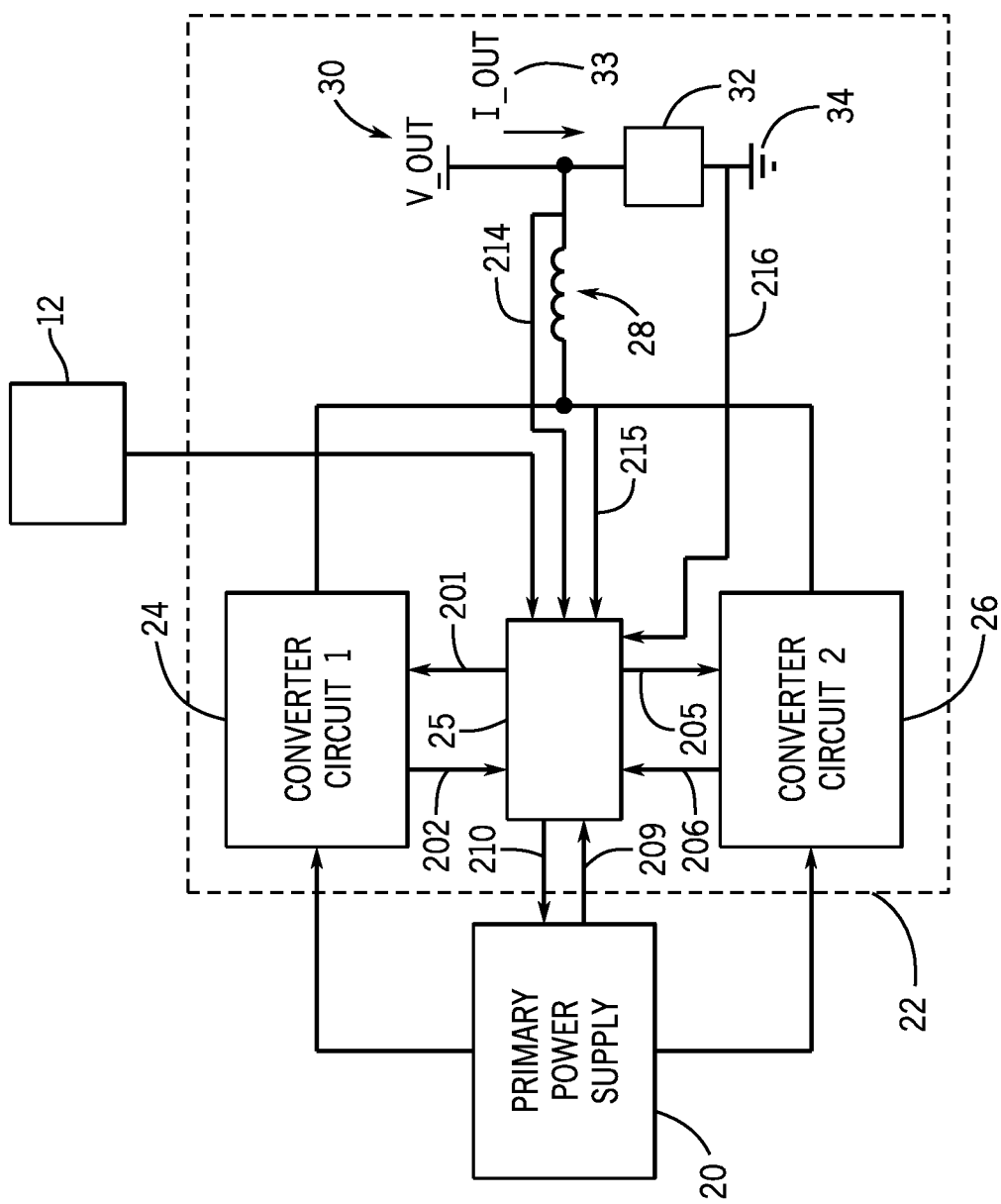
FIG. 2 shows two forward converter circuits.

Internal components of the power supply unit 10 convert input power (from a wall outlet or other source of AC or DC voltage, such as a generator, battery or other source of power), to an output consistent with the voltage, current, and/or power, requirements of a welding or cutting arc maintained between the workpiece and the welding torch 14. FIG. 2 illustrates an exemplary block diagram of components that may be included in the welding or plasma cutting power supply unit 10. Specifically, FIG. 2 illustrates a welding type power circuit that includes primary power supply 20 which receives input power and outputs direct current (DC) to a power circuit 22 comprising a first converter circuit 24 and a second converter circuit 26.

Primary power supply 20 may be transformer based, include a rectifier, or include one or more converters such as buck, boost, cuk, inverter, etc.

The converter circuits 24, 26 operate to combine their respective outputs at a single node, which feeds into a filter inductor 28 that supplies an output voltage 30 (i.e. V_out) for the welding or cutting operation. Welding type power circuit, as used herein, refers to power circuitry that receives an input power and provides welding type power. The welding or cutting arc 32 is supplied with a welding or cutting current 33 and is connected to ground 34. In one embodiment, separate inductors (one for each converter circuit) may be utilized in place of the filter inductor 28. In other embodiments, the inductor 28 may have multiple windings used to combine the outputs of the two converter circuits 24, 26. User interface or control panel 12 provides signals to a controller 25.

Controller 25 provides control signals on lines 201 to converter circuit 24 to control the turning on and off of switches therein. When lines is used herein to refer to a single line shown on a diagram, it refers to one or more cables that carry multiple signals (such as multiple power signals, and/or multiple feedback signals, and/or multiple control signals). Controller 25 receives feedback, preferably voltage and/or current from converter circuit 24 on lines 202. Controller 25 also provides control signals on lines 205 to converter circuit 26 to control the turning on and off of switches therein. Controller 25 receives feedback, preferably voltage and/or current from converter circuit 24 on lines 206. Controller 25 also provides, in some embodiments, control signals on lines 209 to primary power supply 20, and receives feedback on lines 210. Controller 25 receives user input signals from user interface 12 on lines 212. Controller 25 receives feedback signals from the output on lines 214, 215 and 216. Controller, as used herein, refers to digital and analog circuitry, discrete or integrated circuitry, microprocessors, DSPs, FPGAs, etc., and software, hardware and firmware, located on one or more boards, used to control all or part of a welding-type system or a device such as a power supply, power source, engine or generator. The preferred embodiment provides that controller 25 include hardware and logic circuitry.

In one embodiment, the power supply 20 may be a DC source, such as a battery. In other embodiments, the power supply 20 may be a circuit that rectifies incoming alternating current (AC), converting it to DC. In the exemplary block diagram shown in FIG. 2, each of the converter circuits 24, 26 are connected to a single primary power supply 20. In other embodiments, the circuits 24, 26 may be powered from separate power supplies. In further embodiments, the circuits 24, 26 may be connected in parallel or series to the primary power supply 20 at the capacitors 36, 56 of the converter circuits 24, 26. In the embodiment where the circuits 24, 26 are connected in series with a single primary power supply 20, each converter circuit receives half the total voltage of the primary power supply 20, which allows for the use of lower voltage components within the converter circuits 24, 26.

Figure 3:
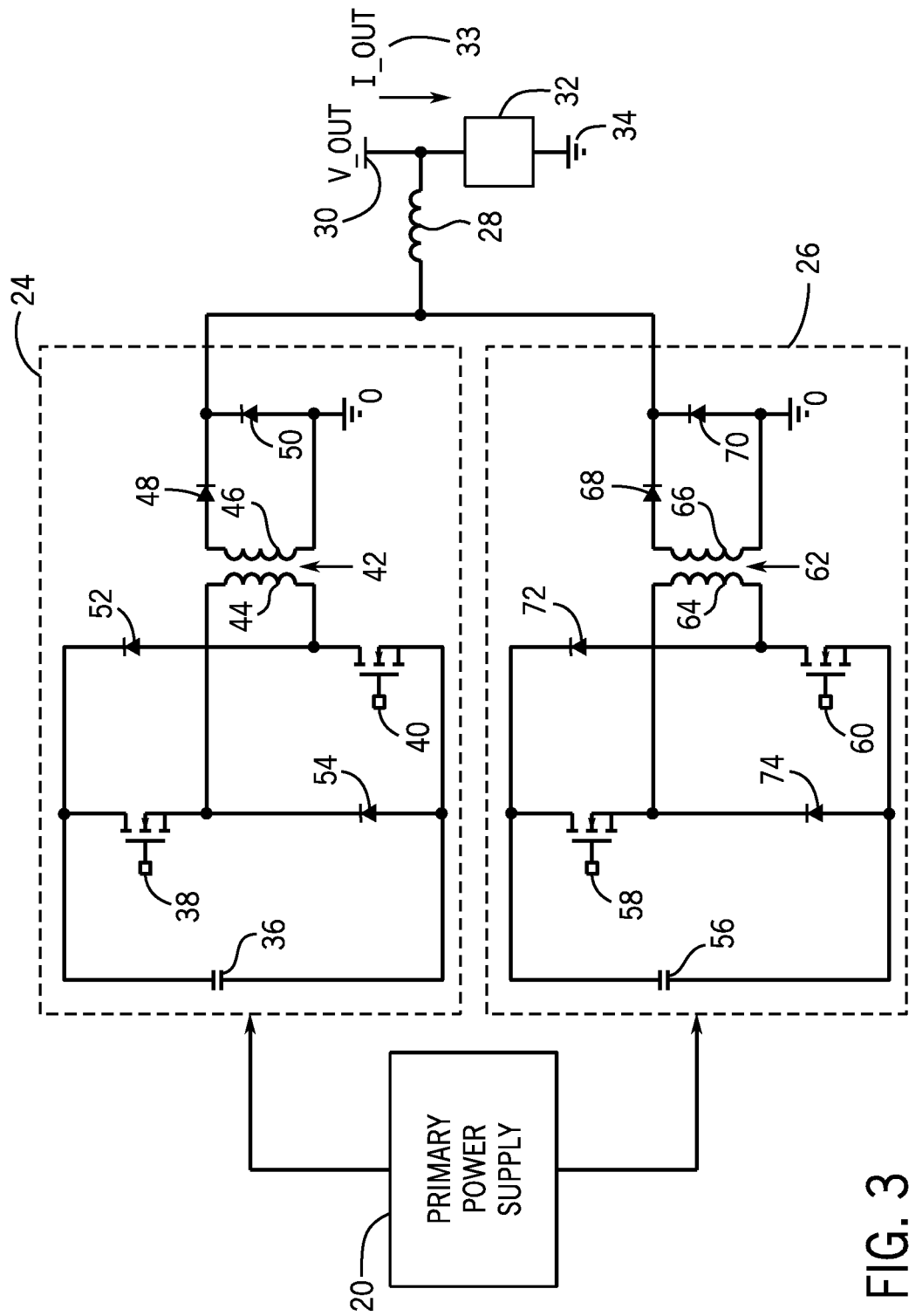
FIG. 3 is a circuit diagram illustrating one embodiment of a power circuit with two forward converter circuits.

FIG. 3 is a circuit diagram illustrating one embodiment of the power circuit 22 comprising the two forward converter circuits 24, 26 in accordance with aspects of present embodiments. Controller 25 can be connected as shown in FIG. 2. As previously described, the primary power supply 20 provides DC power to the first converter circuit 24 and the second converter circuit 26. In the first inverter circuit 24, a voltage is first supplied across a capacitor 36. A pair of power semiconductor switches 38, 40 then chops the DC voltage and supplies it to a transformer 42 on the side of a primary winding 44 of the transformer 42. The transformer 42 transforms the chopped primary voltage to a secondary voltage, at a level suitable for a cutting or welding arc, and supplies it to a secondary winding 46 of the transformer 42. The secondary voltage is then rectified by rectifier diodes 48, 50 and supplied to the filter inductor 28. A set of diodes 52, 54 provide a free-wheeling path for the magnetizing current stored in the transformer 42 to flow when the pair of semiconductor switches 38, 40 turn off, and thus reset the magnetic flux or energy stored in the transformer core.

Similarly, in the second converter circuit 26, a voltage is first supplied across a capacitor 56. A pair of power semiconductor switches 58, 60 then chops the DC voltage and supplies it to a transformer 62 on the side of a primary winding 64 of the transformer 62. The transformer 62 transforms the chopped primary voltage to a secondary voltage and supplies it to a secondary winding 66 of the transformer 62. The secondary voltage is then rectified by rectifier diodes 68, 70 and supplied to the filter inductor 28. A set of diodes 72, 74 provide a free-wheeling path for the magnetizing current stored in the transformer 62 to flow when the pair of semiconductor switches 58, 60 turn off, and thus reset the magnetic flux or energy stored in the transformer core.

The combined rectified secondary voltage is supplied to the welding or cutting power supply output 30 and a welding or cutting current or welding type output current 33 is output from the circuits 24, 26. Welding type output current, as used herein, refers to current suitable for welding, plasma cutting, induction heating and/or hot wire welding/preheating (including laser welding and laser cladding). In other embodiments, the forward converter circuits 24, 26 may include additional components or circuits, such as snubbers, voltage clamps, resonant "lossless" snubbers or clamps, gate drive circuits, pre-charge circuits, pre-regulator circuits, and so forth. Further, as previously noted, the forward converter circuits 24, 26 may be arranged in parallel or in series in accordance with present embodiments, meaning that the capacitors 36, 56 may be connected in series or in parallel Additionally, in further embodiments, the output of the first converter circuit 24 and the output of the second converter circuit 26 may be connected in series. In this embodiment, a single ground is configured to support both circuits 24, 26, and the output of the diodes 48, 50 of the first converter circuit 24 couples with the output of the diodes 68, 70 of the second converter circuit 26 before entering the inductor 28. A more detailed description of the circuit's operation is found in the '293 patent.

Figure 4:
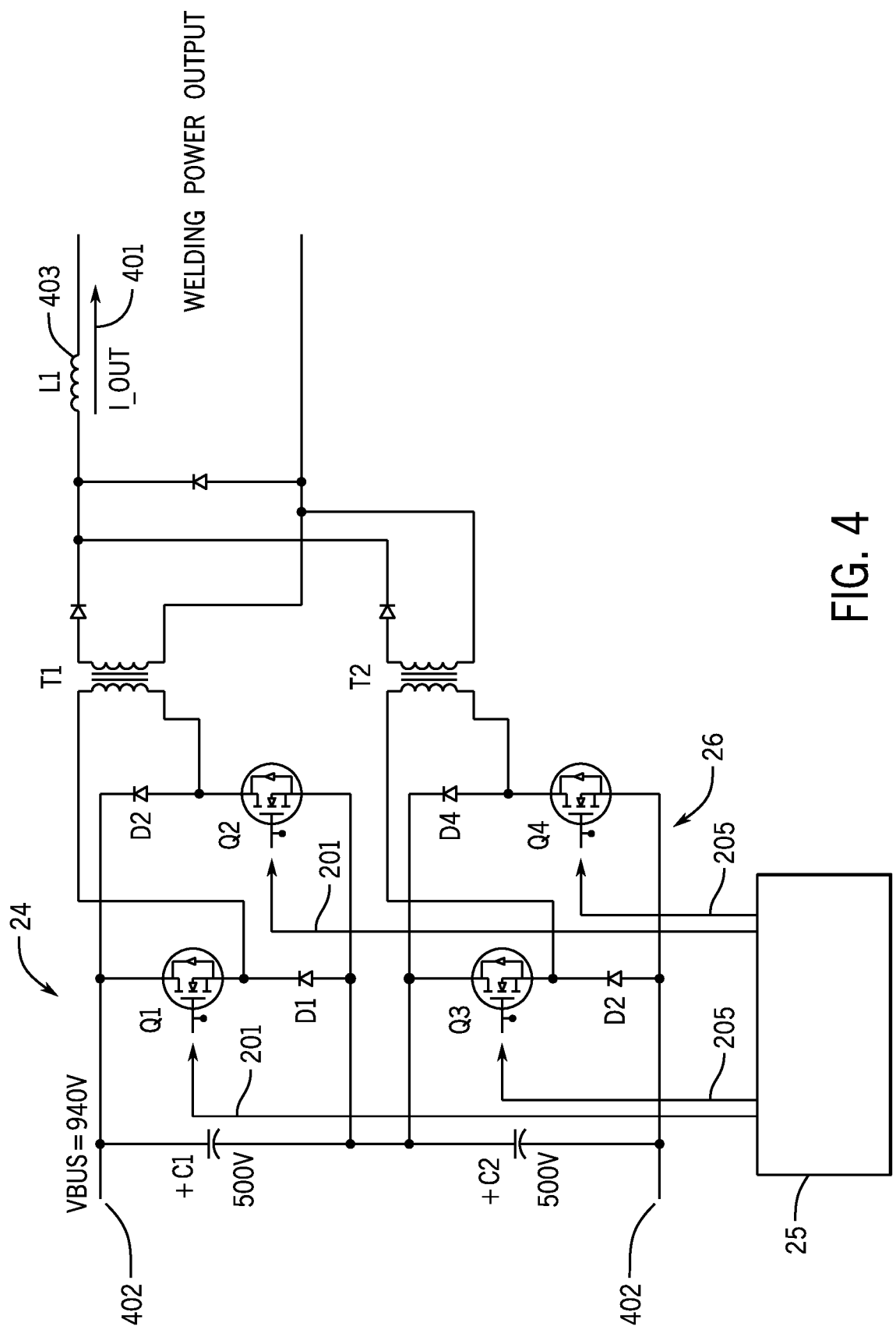
FIG. 4 is a circuit diagram illustrating a second embodiment of a power circuit with two forward converter circuits.
Figure 5:
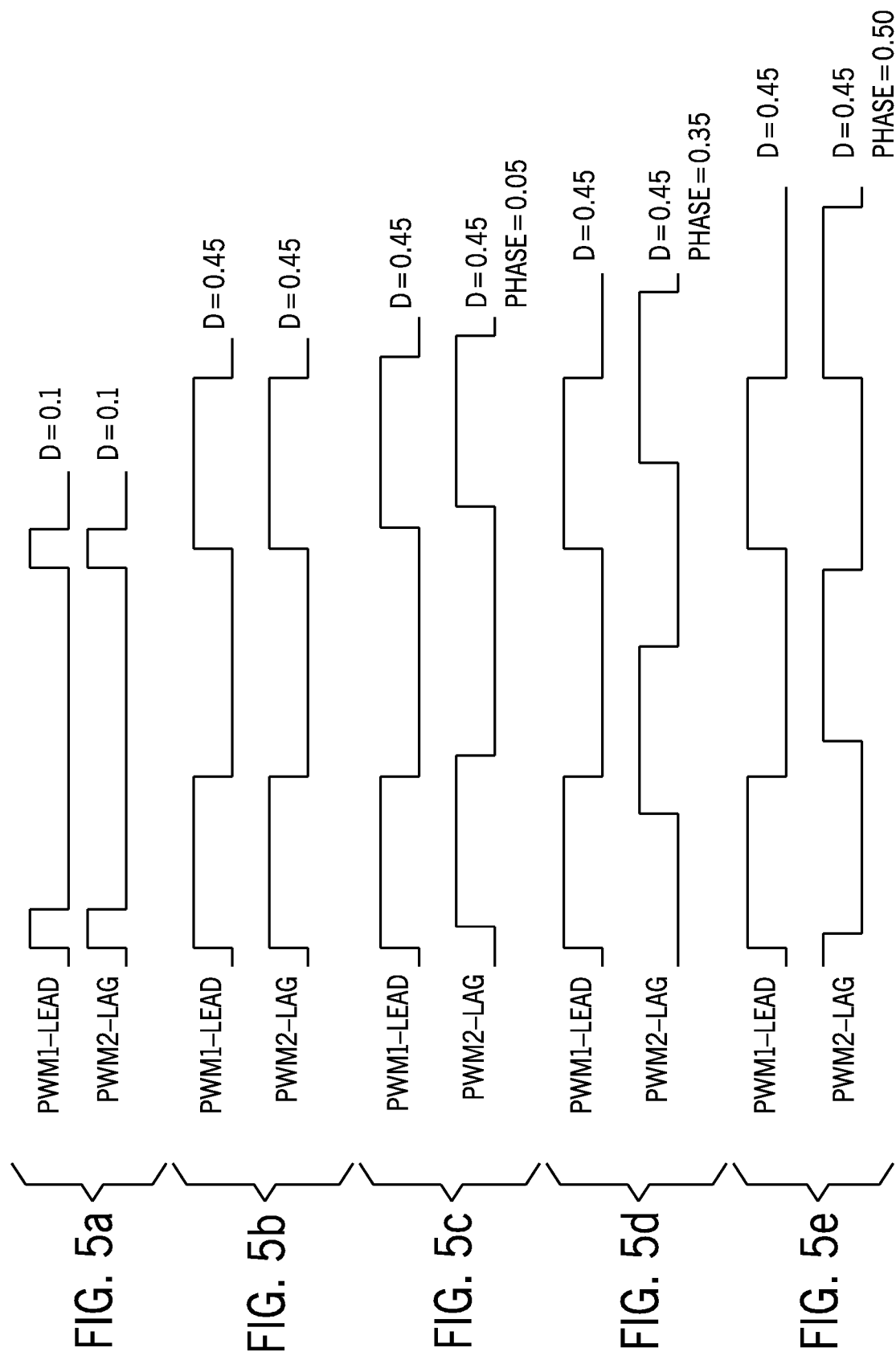
FIGS. 5a-5e illustrate the relative phase in a PSDF mode of operation of two converters.
Figure 6:
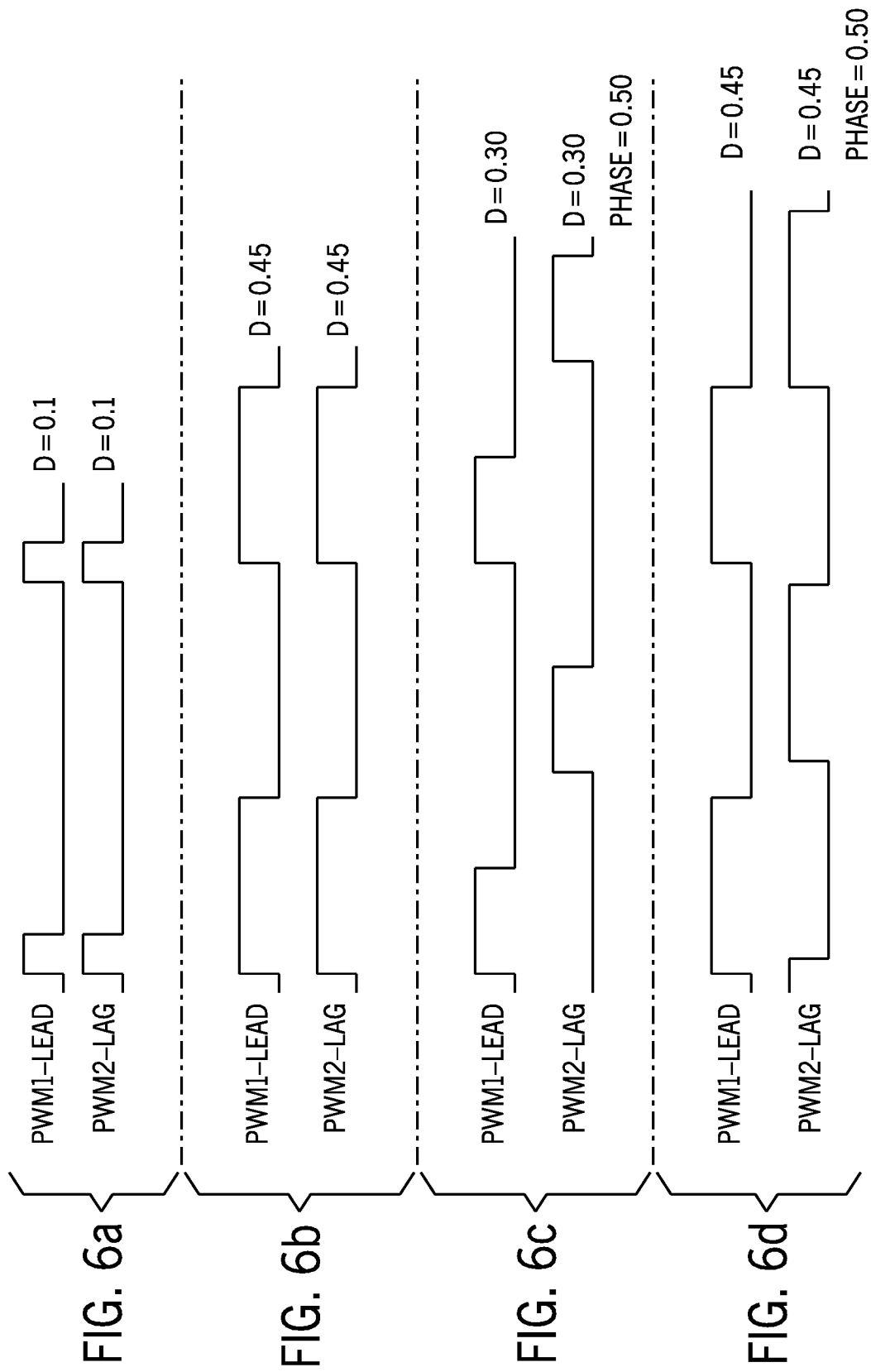
FIGS. 6a-6d illustrate the relative phase in an alternative PSDF mode of operation of two converters.

FIG. 4 shows another embodiment of converters 24 and 26 with controller 25 providing switching/timing signals to the switches. The converters operate from a common DC bus 402 and provide a combined welding type output. Output current 401 flows in an output inductor 403. In this alternative, converters 24 and 26 operate in a stacked manner, meaning they are connected in a series arrangement such that each converter is operating from ½ of VBUS.

FIGS. 5a-5e illustrate the PSDF mode of operation. The relative phase and PWM duty cycle of the two converters is responsive to a control signal. PWM1 is the timing signal (on/off signal) of one of converters 24 and 26, and PWM2 is the timing signal (on/off signal) of the other. It does not matter which is leading and which is lagging. As can be seen, they remain in phase until a duty cycle of 0.45 (Dmax), and after Dmax (0.45) the phase varies up to 0.5.

FIGS. 6a-6d illustrates an alternate PSDF mode of operation describe above. Converters 24 and 26 operate in phase until a maximum duty cycle (Dmax) is reached, as a control signal increases the two converters jump fully out of phase but at ½ the duty cycle each. A further increase in control signal will further increase the out of phase duty cycles until each converter is operating at maximum duty cycle once again in a fully phase shifted manner PWM1 is the timing signal (on/off signal) of one of converters 24 and 26, and PWM2 is the timing signal (on/off signal) of the other. It does not matter which is leading and which is lagging. As can be seen, the phase varies up to 0.5.

Figure 7:
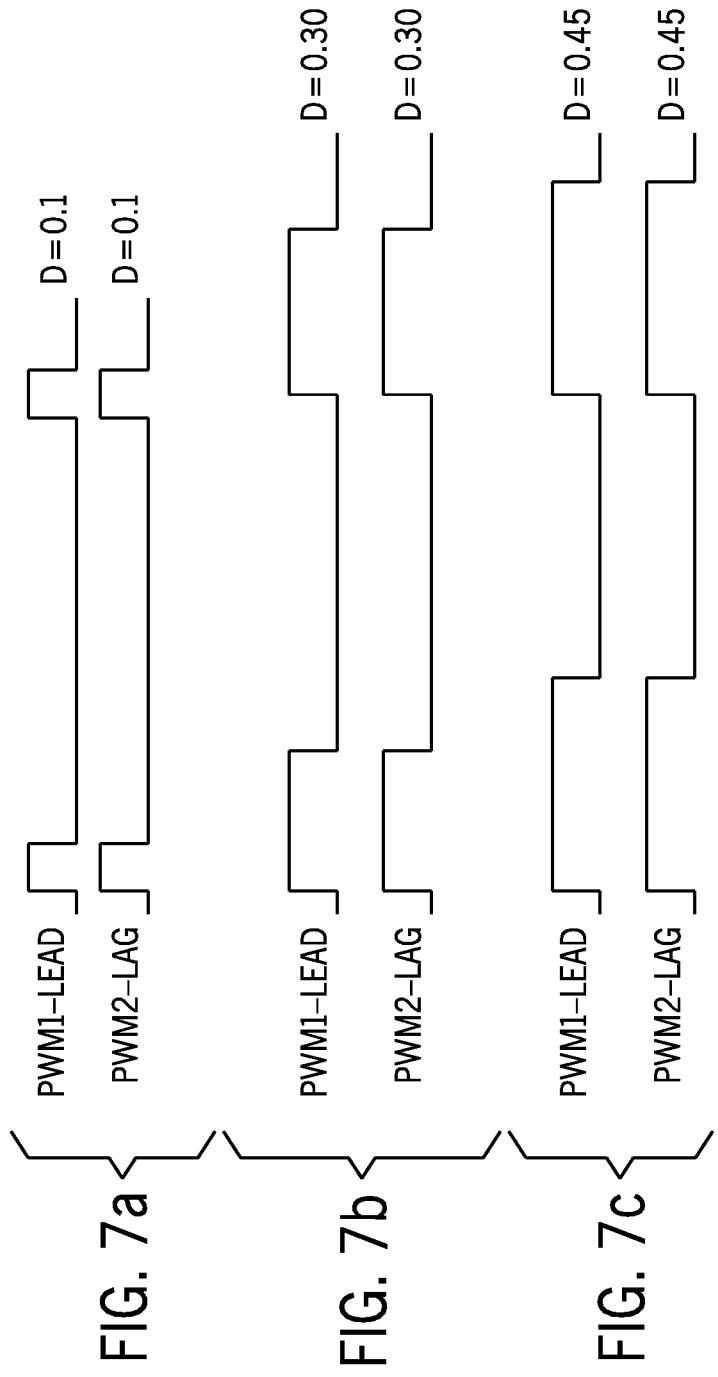
FIGS. 7a-7c illustrate the relative phase in a LIP mode of operation of two converters.

FIGS. 7a-7c illustrate the LIP mode of operation. Converters 24 and 26 are locked in phase and the in-phase duty cycles of the two converters are responsive to a control signal. PWM1 is the timing signal (on/off signal) of one of converters 24 and 26, and PWM2 is the timing signal (on/off signal) of the other. It does not matter which is called leading and which is called lagging. They are locked in phase for all duty cycles.

Figure 8:
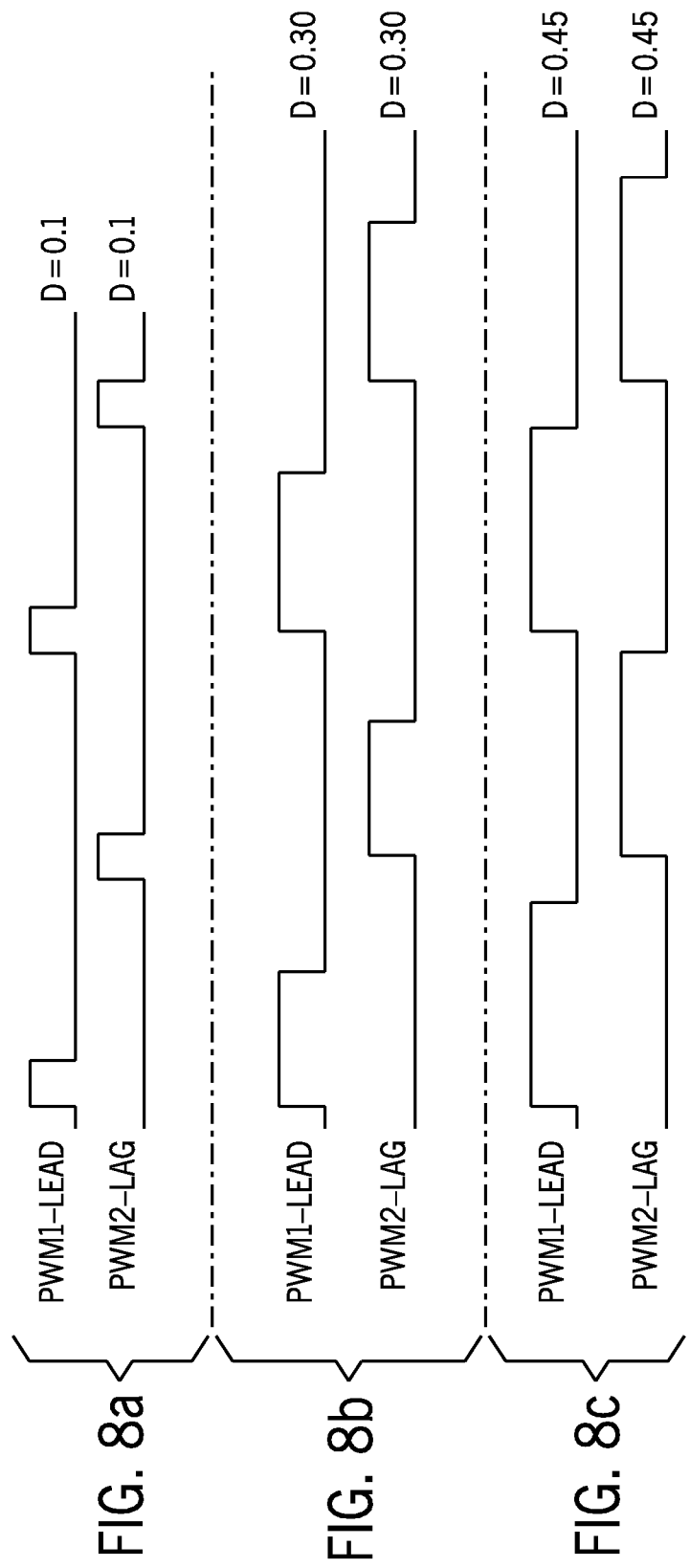
FIGS. 8a-8c illustrate the relative phase in a FPS mode of operation of two converters.

FIGS. 8a-8c illustrates FPS mode of operation where the two converters are locked fully out of phase for all phase duty cycles. The duty cycle of the two converters is responsive to a control signal. This embodiment provides a 50% relative phase. Alternatives provide for other relative phases, including from 40% to 50% and from 25% to 50%. PWM1 is the timing signal (on/off signal) of one of converters 24 and 26, and PWM2 is the timing signal (on/off signal) of the other. It does not matter which is leading and which is lagging.

Figure 9:
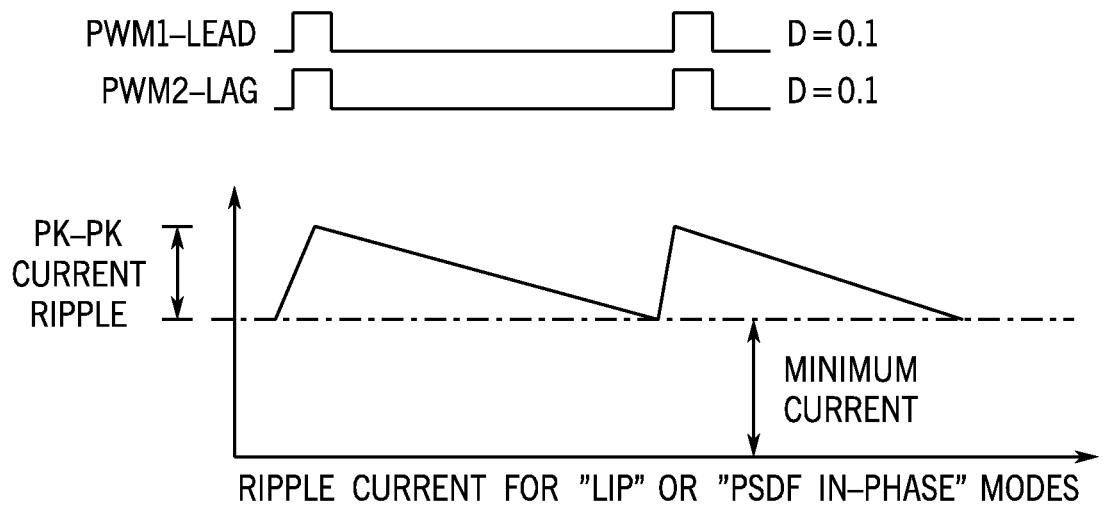
FIG. 9 shows output ripple current component in an LIP or PSDF mode of operation of two converters.
Figure 10:
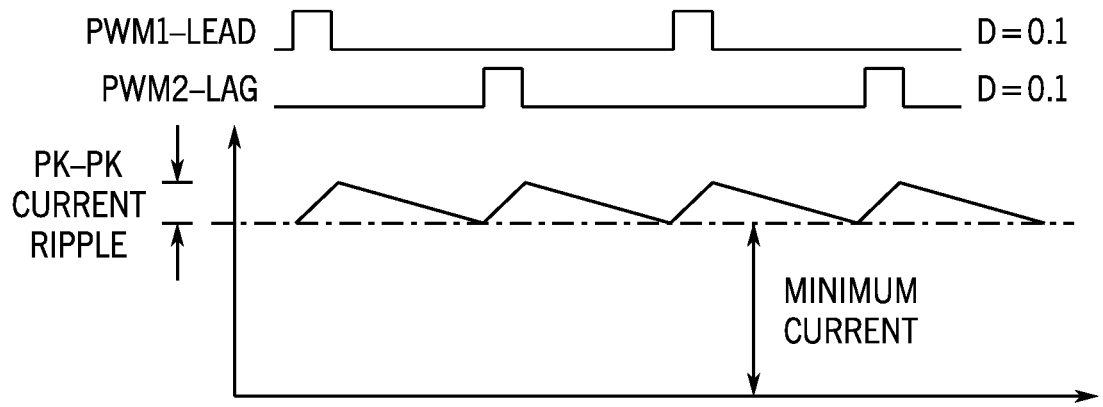
FIG. 10 shows output ripple current component in an FPS mode of operation of two converters.

FIGS. 9 and 10 illustrates the effect on the output ripple current component of I_OUT, for FPS mode (FIG. 10) compared to LIP or PSDF mode (FIG. 9) while operating in phase. FPS mode may have a decreased peak to peak ripple magnitude and an increased frequency of the ripple component. The decreased peak to peak magnitude may be beneficial for certain welding processes such as low current SMAW, because of the increased minimum current level reached at the valley of the ripple. This can reduce arc outages and make a more stable and consistent welding arc.

Figure 11:
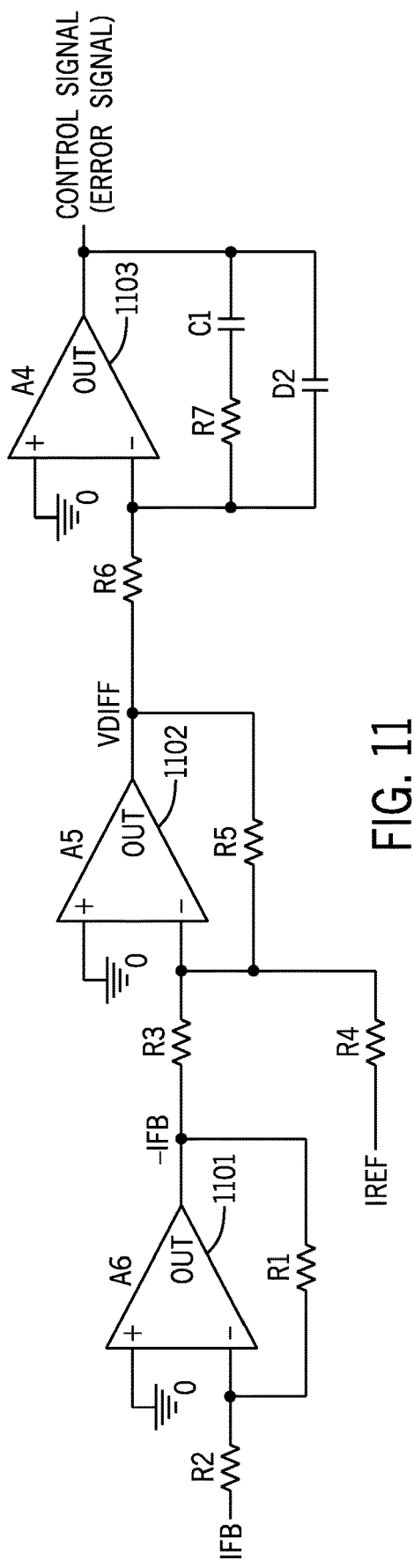
FIG. 11 shows a control circuit or error module.

FIG. 11 shows a control circuit or error module that may be used to generate a control signal, that can be used as an input to set operating PWM duty cycles and phase shifts according to the three different modes of operation (LIP, FPS & PSDF). The error module of FIG. 11 is a control module that provides an error or control signal. Control module, as used herein, may be digital or analog, and includes hardware or software, that performs a specified control function. Module, as used herein, refers to software and/or hardware that cooperates to perform one or more tasks, and can include digital commands, control circuitry, power circuitry, networking hardware, etc. The control module shown is a typical closed loop circuit with a current feedback input (IFB) that is proportional or representative of the actual output current of the welding power supply (I_OUT). An inverter 1101 inverts IFB, and provides it to differential op amp 1102. An IREF input provides a command or desired operating output current. IREF may be generated by a weld process module such that IREF provides the necessary characteristic for the welding arc. IREF may be constant or may vary based on time, voltage feedback or other conditions. (Ex. hot-start, arc start, dig, droop, etc.) A difference signal (VDIFF) is generated by op amp 1102 and provided to op amp 1103 which provides an output control signal (also called and error signal) that is typically scaled, for example, from 0 to 10 volts. The control circuit may be implemented in hardware, software, or a combination. Alternative control circuits, including one implemented in software, could be used. It is well within the prior art to generate a pulse width from the error signal—and typically a linear relationship is used, with a maximum pulse width corresponding to the maximum error signal.

Figure 12:
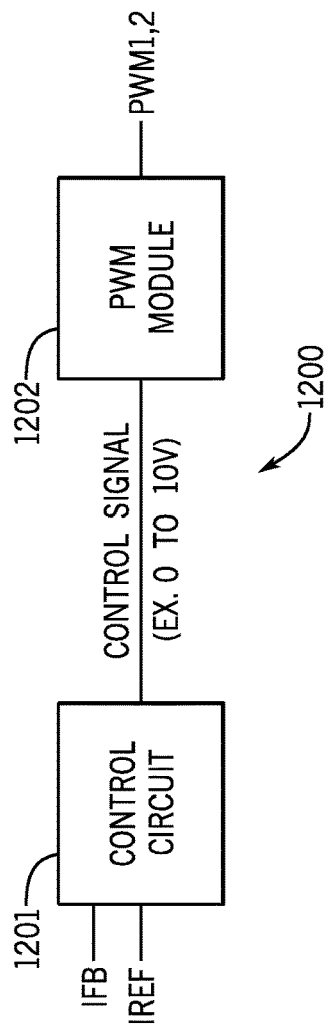
FIG. 12 shows a part of a controller that is a PWM module.

FIG. 12 shows a part of a controller that is a PWM module 1200, and includes an error module 1201 and a phase relationship module 1202. Error module 1201 may be that shown in FIG. 11. Phase relationship module 1202 may be implemented as described below, and converts a control signal to a range of PWM duty cycle values for PWM1 & PWM2 with a fixed or variable phase relationship between PWM1 & PWM2. The PWM1 and PWM2 outputs are timing outputs provided to converters 24 and 26. This is implemented using other controllers in alternative embodiments. Pwm module, as used herein, is a module that sets the pulse width of the converters, including setting the start and end times of the pulses.

The preferred embodiment provides that when the controller operates in the LIP mode the conversion of the control error signal to the pwm duty cycle by pwm module 1202 may produce a duty cycle range of 0 to 45% with fixed phase of 0. The preferred embodiment provides that when the controller operates in the FPS mode the conversion of the control error signal to the pwm duty cycle by pwm module 1202 may produce a duty cycle range of 0 to 45% with fixed phase of 50%. The preferred embodiment provides that when the controller operates in a PSDF mode the conversion may produce an effective duty cycle range of 0 to 90% when the combined effect of PWM duty cycles and relative phase shift is considered. Thus, for a given range of control signal (ex. 0 to 10V) a finer resolution of PWM duty cycle control may be realized for the LIP & FPS modes compared to the PSDF mode. For example, in the LIP or FPS modes a PWM duty cycle range/control signal range=45%/10V=4.5% per volt of control signal while in the PSDF mode the PWM duty cycle range/control signal range=90%/10V=9% per volt of control signal.

The preferred embodiment of the invention provides that one of the three modes (LIP, PSDF, FPS) is selected in response to a user selected process. Alternatives provides that the mode is selected in response to the process set by program, sensing, automatically, etc. Other alternatives provides that the mode is selected in response to something other than the process, such as material type, type of welding procedure, output needed, etc.

Figure 13:
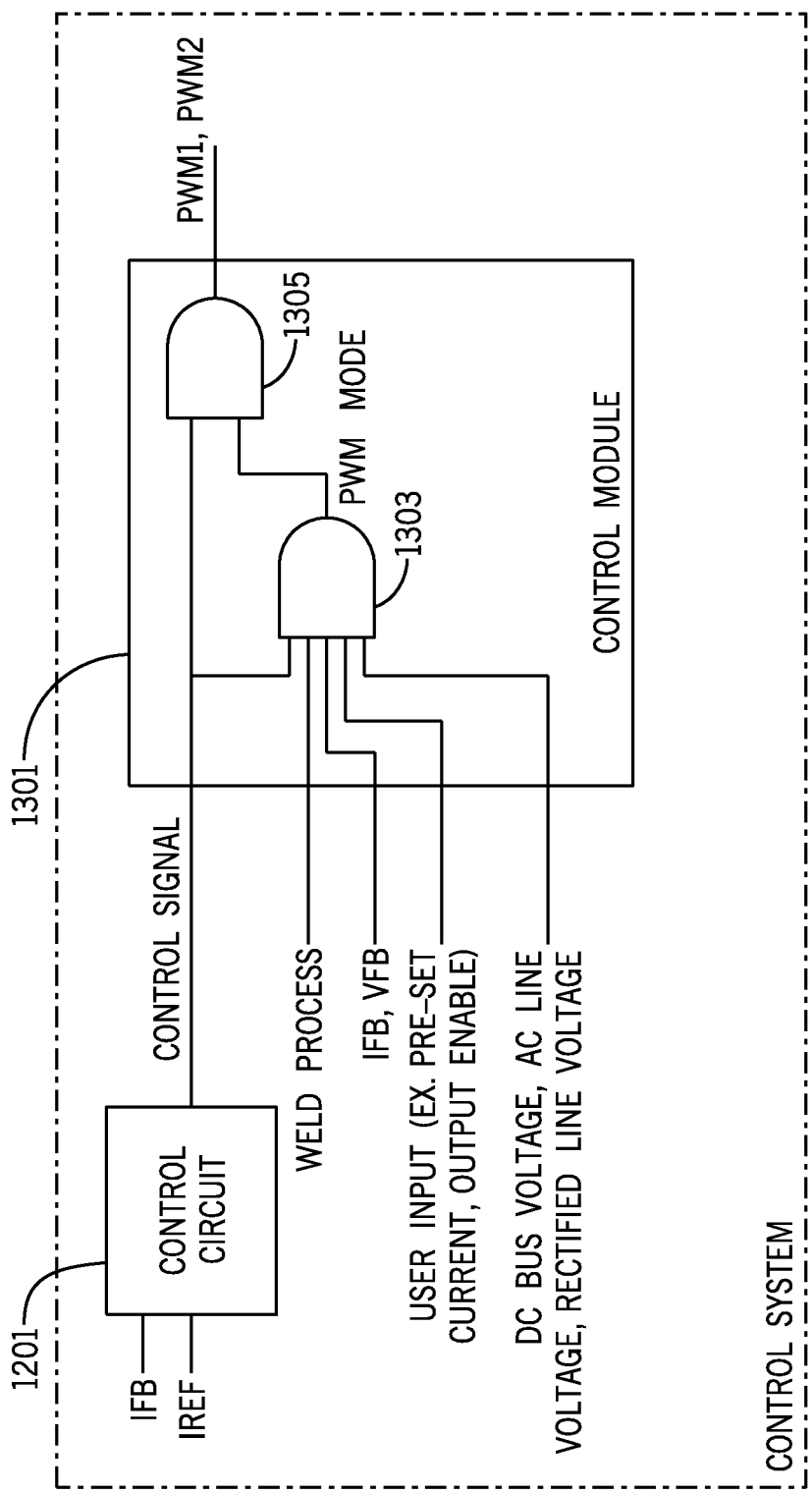
FIG. 13 shows a sub-module which is part of phase relationship module.

Each mode of operation can be called a phase relationship. The phase relationship of PSDF is variable, the phase relationship of LIP is locked in phase, and the phase relationship of FPS is fixed phase staggered. FIG. 13 shows a sub-module 1301 which is part of phase relationship module 1202. Phase relationship module 1202 (and submodule 1301) select the phase relationship, and maintain the selected phase relationship over a predetermined range of outputs. Maintaining a phase relationship over a predetermined range of outputs, as used herein, refers to not changing from a selected one of variable phase shifting, fixed phase staggering, and locked in phase, as the output changes magnitude over a range that is predetermined. Phase relationship module, as used herein, is a control module that selects a relative phase relationship of at least two converter circuits from at least two available phase relationships in response to an input to the phase relationship module, wherein the at least two available phase relationships are at least two phase relationships of variable phase shifting, fixed phase staggering and locked in phase, and wherein the selected phase relationship is maintained over a predetermined range of outputs.

Module 1301 selects one mode of operation (or the phase relationship) from the three modes in the modes or phase relationships (LIP, FPS or PSDF). Module 1202 generates two PWM signals with a pulse width (PWM value) and a phase shift relationship, based on the selected mode of operation. Submodule 1301 receives the error/control signal from module 1201, and provides the desired pwm control signals. Module 1301 includes a logic module 1303 which receives as inputs the control/error signal, a weld process signal, feedback signals, user inputs, and bus, intermediate or input signals. Alternatives provide for using more or fewer and/or different inputs.

Logic module 1303 determines the type of mode desired, based on the inputs. For example, as described above it may be beneficial to select one PWM mode of operation for a particular weld process, such as LIP for GTAW and another PWM mode such as FPS for SMAW, and a third mode of operation for another weld process such as PSDF for GMAW or Pulsed GMAW. Based on the inputs the proper mode of operation and the proper pwm signals are generated. Providing the particular desired output is readily performed once the mode is selected, and can be in accordance with the prior art. However, the prior art fails to show selecting the proper mode, particularly as taught herein, nor a phase relationship module 1202 nor a sub module 1301.

The PWM mode maybe pre-selected based on a pre-selected weld process, meaning it may be set under static conditions when the output of the welding power supply is not enabled. Additional inputs may be combined to either pre-select the PWM mode in a static condition, or dynamically select a PWM mode while providing a welding output. For example FPS mode may be selected for SMAW when the user pre-set current is below a certain level, PSDF mode selected for SMAW when the current is above a certain level, and LIP mode for SMAW when the pre-set current is above another higher level. The preferred embodiment provides that the selected phase relationship is maintained over a predetermined range of outputs.

In one embodiment module 1202 includes three parallel submodules 1301, one for each of LIP, PSDF, and FPS. Each module can be identical, but with some different inputs for the process, and with each having outputs consistent with one of the modes described above and illustrated in FIGS. 5-8. This embodiment provides that each module 1303 ANDS the various input and enables the output of module 1305 when all inputs are a logic one. One module 1301 can be for the LIP mode, so if a GTAW process is selected, then the control is enabled. If, a process other than GTAW is selected, then the control is disabled, and another submodule 1301 would be enabled for the desired mode. The PWM mode may be pre-selected based on a pre-selected weld process, or pre-select the PWM mode in a static condition, or dynamically select a PWM mode while providing a welding output.

Both the preferred single submodule 1301 or the alternative multiple parallel submodules 1301 can have the weld process input include waveform generation information that is used to select the PWM mode of operation. For example FPS mode may be selected during a low current or background current level of a pulse or other waveform, and LIP or PSDF modes selected for a high current or other portions of a welding waveform. An output enable input such as a torch gun trigger switch may be used as an input to the control module as part of the PWM mode selection logic. This logic input may be used to allow a change in PWM mode of operation only for a static condition when the output in not enabled, or it may be used to allow a change in PWM mode dynamically while the output is enabled. Other embodiments provides that the phase relationship is maintained for at least half of the rated output for the welding-type power supply. One embodiment provides that for the lower 50% of the output range the FPS phase relationship is used, and then for the upper 50% of the range the LIP or PSDF phase relationship is used. Another embodiment provides that the phase relationship is maintained for a range of duty cycles, for example, from 25% to 50%.

A DC bus voltage, AC line voltage, rectified line voltage or a scaled signal representative of the magnitude of one of these voltages may be used as an additional input to the control module. For example a multi-voltage input welding power supply rated for two inputs such as 115 VAC and 230 VAC may select FPS mode for the lower line voltage and LIP or PSDF mode for the higher line voltage. The lower line voltage (115 VAC) may generated a reduced DC bus voltage and subsequent reduction in the weld output load line compared to the higher line voltage, and a fixed PWM mode of operation. FPS mode can be used to compensate and provide a higher weld output load line for the lower line voltage, and LIP or PSDF modes may be used for higher line voltage such that a similar output load line is generated for the two line voltages.

A reduction in output rated current may also be implemented for the lower line voltage (115 VAC) compared to the higher line voltage to account for the fact that the two forward converters are each carrying full load current for FPS modes, as compared to sharing the load current for the in phase modes of operation (LIP, PSDF in phase).

Additional inputs may include for example IFB & VFB indicative of the actual output current and voltage. One or both of these may serve as inputs to select a PWM mode of operation. For example LIP mode may be selected for an OCV (open circuit voltage) condition of the welding power supply, as a means to reduce the average OCV. This condition may override another selected PWM mode, such as FPS mode which may be selected based on a weld process (ex. SMAW) and a pre-set current level A time delay may need to be satisfied before the OCV condition overrides the pre-selected PWM mode.

Numerous modifications may be made to the present disclosure which still fall within the intended scope hereof Thus, it should be apparent that there has been provided a method and apparatus for a welding-type power supply and method of providing welding type power that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. A method of providing welding type power comprising:
   receiving input power;
   pulse width modulating a first forward converter and a second forward converter, such that they operate as a pulse width modulated double forward converter to provide a welding type output based on a control signal;
   selecting a phase relationship from at least two available phase relationships between the first forward converter and a second forward converter, wherein the at least two available phase relationships are at least two phase relationships of variable phase shifting, fixed phase staggering and locked in phase;

adapting the control signal to an effective duty cycle range of the first forward converter and the second forward converter based on the selected phase relationship, wherein the effective duty cycle range is greater for the variable phase shifting phase relationship than for the fixed phase staggering and locked in phase relationships; and maintaining the selected phase relationship over a predetermined range of outputs.

2. The method of claim 1, wherein the selecting a selected phase relationship is performed in response to at least one of feedback responsive to the welding type output, a user input and a process selection.

3. The method of claim 2, wherein the selecting a selected phase relationship is performed in response to a user input indicative of at least one of a desired output current, a desired peak output current and a desired output voltage.

4. The method of claim 2, wherein the selecting a selected phase relationship is performed in response to at least one of a user selected SMAW process, a user selected GTA W process and a user selected GMA W process.

5. The method of claim 2, wherein the selecting a selected phase relationship is performed in response to feedback responsive to at least one of a welding type output current, a welding type output voltage, a welding type peak current and a welding type output power.

6. The method of claim 1, wherein maintaining the selected phase relationship over a substantial range of outputs includes maintaining the selected phase relationship for at least one half of a rated output.

7. The method of claim 1, wherein maintaining the selected phase relationship over a substantial range of outputs includes maintaining the selected phase relationship for a range of duty cycles.

8. The method of claim 1, wherein pulse width modulating a first forward converter and a second forward converter includes pulse width modulating a first forward converter stacked with a second forward converter and combining a first forward converter output with a second forward converter output.

9. A welding type power supply, comprising:

a double forward converter having a first and second converter; and a controller, where the controller includes a pwm module configured to set the pwm timing signals based on a control signal representative of a desired welding type output, and wherein the pwm module includes a phase relationship module having a plurality of timing outputs connected to the double forward converter, wherein the phase relationship module is configured to select a phase relationship from at least two available phase relationships between the first forward converter and a second forward converter, wherein the at least two available phase relationships are at least two phase relationships of variable phase shifting, fixed phase staggering and locked in phase, and to maintaining the selected phase relationship over a predetermined range of outputs, and the pwm module is configured to adapt the control signal to an effective duty cycle range of the first forward converter and the second forward converter based on the selected phase relationship, wherein the effective duty cycle range is greater for the variable phase shifting phase relationship than for the fixed phase staggering and locked in phase relationships.

10. The welding-type power supply of claim 9, wherein the phase relationship module has and is responsive to an input, wherein the input is connected to receive at least one of feedback responsive to the welding type output, a user input and a process selection.

11. The welding-type power supply of claim 10, wherein the input is connected to receive a user input indicative of at least one of a desired output current, a desired peak output current and a desired output voltage.

12. The welding-type power supply of claim 10, wherein the input is connected to receive at least one of a user selected SMAW process, a user selected GTAW process and a user selected GMAW process.

13. The welding-type power supply of claim 10, wherein the input is connected to receive feedback responsive to at least one of a welding type output current, a welding type output voltage, a welding type peak current and a welding type output power.

14. The welding-type power supply of claim 13, wherein the phase relationship module is responsive to the welding type output current being greater than one half of a rated output.

15. The welding-type power supply of claim 9, wherein the first forward converter and the second forward converter are stacked.

* * * * *